United States Patent
Staun

(10) Patent No.: US 11,918,143 B2
(45) Date of Patent: Mar. 5, 2024

(54) METHOD AND APPARATUS FOR A COOKING APPLIANCE

(71) Applicant: Midea Group Co., Ltd., Foshan (CN)

(72) Inventor: Paul R. Staun, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 714 days.

(21) Appl. No.: 17/091,415

(22) Filed: Nov. 6, 2020

(65) Prior Publication Data
US 2022/0142402 A1 May 12, 2022

(51) Int. Cl.
A47J 37/06 (2006.01)
A47J 27/04 (2006.01)
A47J 37/04 (2006.01)

(52) U.S. Cl.
CPC .......... *A47J 37/0641* (2013.01); *A47J 27/04* (2013.01); *A47J 37/049* (2013.01); *A47J 2027/043* (2013.01)

(58) Field of Classification Search
CPC ...... A47J 27/04; A47J 37/049; A47J 37/0641; A47J 2027/043
See application file for complete search history.

(56) References Cited

U.S. PATENT DOCUMENTS

| | | | |
|---|---|---|---|
| 6,904,903 B1* | 6/2005 | Vroom | A21B 3/04 219/400 |
| 2013/0146045 A1 | 6/2013 | Vulliermet | |
| 2016/0025350 A1* | 1/2016 | Goble | F24C 7/085 99/331 |
| 2017/0245683 A1 | 8/2017 | Chen et al. | |
| 2018/0035698 A1 | 2/2018 | McNerney et al. | |
| 2019/0045964 A1 | 2/2019 | Gill et al. | |
| 2020/0060473 A1 | 2/2020 | Gill et al. | |

FOREIGN PATENT DOCUMENTS

| CN | 203723885 U | 7/2014 |
|---|---|---|
| CN | 209121866 U | 7/2019 |

* cited by examiner

*Primary Examiner* — Alfred Basichas
(74) *Attorney, Agent, or Firm* — Gray Ice Higdon

(57) ABSTRACT

A method and apparatus for a cooking appliance. The cooking appliance may include air frying in one heating compartment and steaming in another heating compartment. Each heating compartment may include at least one food container. The food container may be a drawer. One or more heating devices may be in communication with the one or more heating compartments. One or more circulating devices may be used to circulate air. A controller may be used to heat the contents of the one or more heating compartments and circulate the air.

14 Claims, 4 Drawing Sheets

METHOD AND APPARATUS FOR A COOKING APPLIANCE

BACKGROUND

The present embodiments relate to a method and apparatus for an air fryer heating compartment and a steam heating compartment integrated into a cooking appliance.

Typical air fryers may air fry food in a dedicated air fryer heating compartment. However, this practice of using the air fryer heating compartment does not allow other varieties of food to be cooked in a different manner and at various times, and reduces the variety of food prepared. Thus, there is a need to steam a variety of food products separate from the air fryer heating compartment.

SUMMARY

In some embodiments, a cooking appliance may include a housing defining a first heating compartment. In various embodiments, the appliance may include a first food container positioned in the first heating compartment. In some embodiments, the appliance may include a circulating device and a first heating device in communication with the first food container to heat the contents by circulated air within the first food container. In various embodiments, the housing may define a second heating compartment. In some embodiments, the appliance may include a second food container positioned in the second heating compartment. In various embodiments, the appliance may include a second heating device in communication with the second food container to steam the contents within the second food container. In some embodiments, the appliance may include a controller configured to control the first heating device and the circulating device to circulate hot air to the contents within the first food container. In various embodiments, the controller may be configured to control the second heating device to steam the contents within the second food container.

In addition, in some embodiments, the controller may circulate hot air to the contents within the first food container for a first time period and may steam the contents within the second food container for a second time period. In various embodiments, at least a portion of the first time period may overlap with at least a portion of the second time period. In some embodiments, the controller may control the first heating device for a first time period and the second heating device for a second time period. In various embodiments, the first heating compartment may be positioned above the second heating compartment. In some embodiments, the first heating device and the circulating device may be positioned above the first heating compartment and the second heating device may be positioned below the second heating compartment. In various embodiments, the appliance may include one or more inlets and one or more outlets, wherein the first heating compartment may be in communication with the one or more inlets, and wherein the one or more outlets may be in downstream communication with at least one of the first heating compartment and the second heating compartment. In addition, in some embodiments, the second food container positioned in the second heating compartment may include a drawer. In various embodiments, the drawer may include a lid.

In some embodiments, a cooking appliance may include a housing defining a first heating compartment. In various embodiments, the appliance may include a first food drawer positioned in the first heating compartment. In some embodiments, the appliance may include a circulating device and a first heating device positioned above the first food drawer and is in communication with the first food drawer to heat the contents by circulated air within the first food drawer. In various embodiments, the housing may define a second heating compartment below the first heating compartment. In some embodiments, the appliance may include a second food drawer positioned in the second heating compartment. In various embodiments, the appliance may include a second heating device positioned below the second food drawer and is in communication with the second food drawer to steam the contents within the second food drawer. Moreover, in some embodiments, the appliance may include a controller configured to control the first heating device and the circulating device to circulate hot air to the contents within the first food drawer. In various embodiments, the controller may be configured to control the second heating device to steam the contents within the second food drawer.

In addition, in some embodiments, the appliance may include one or more inlets and one or more outlets, wherein the first heating compartment may be in communication with the one or more inlets, and wherein the one or more outlets may be in downstream communication with at least one of the first heating compartment and the second heating compartment. In some embodiments, the second food drawer may include a lid. In various embodiments, the controller may control the first heating device for a first time period and the second heating device for a second time period. In some embodiments, at least a portion of the first time period may overlap with at least a portion of the second time period. In various embodiments, the controller may circulate hot air to the contents within the first food drawer for a first time period and may steam the contents within the second food drawer for a second time period. In some embodiments, at least a portion of the first time period overlaps with at least a portion of the second time period.

In some embodiments, a method of air frying food in a first heating compartment and steaming food in a second heating compartment within a cooking appliance may include placing at least one first food product into a first food container within the first heating compartment of a housing. In various embodiments, the method may include placing at least one second food product and water into a second food container within the second heating compartment of the housing. In some embodiments, the method may include cooking the at least one first food product in the first food container by heating air and circulating air for at least a first time period. Moreover, in various embodiments, the method may include steaming the at least one second food product in the second food container by heating the water for at least a second time period.

In addition, in some embodiments, the method of cooking may include heating the air by a first heating device. In various embodiments, the method of steaming may include heating the water by a second heating device. In some embodiments, at least a portion of the first time period may overlap with at least a portion of the second time period. In various embodiments, the method may include controlling a temperature within each one of the first heating compartment and the second heating compartment. In some embodiments, the first food container may be a first drawer and the second food container may be a second drawer. In some embodiments, the first drawer may be positioned above the second drawer. In various embodiments, the method may include exhausting at least one of air and water from at least one of the first heating compartment and the second heating compartment.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
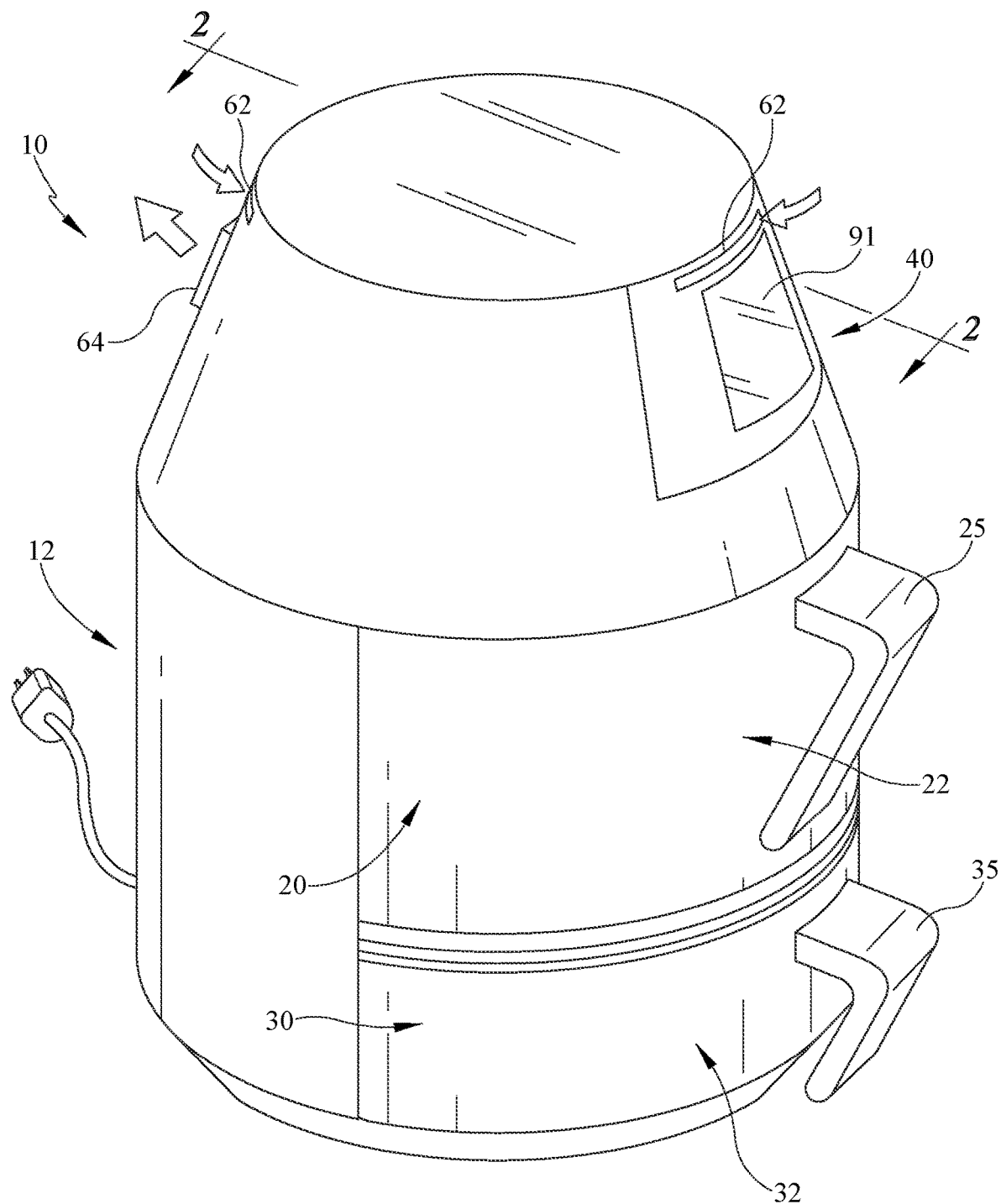
FIG. 1 is a perspective view of one embodiment of a cooking appliance illustrating the steam food container and the air fryer food container in the closed or stowed position.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a residential cooking appliance such as cooking appliance 10, such as the type that may be used in single-family or multi-family dwellings, or in other similar applications. As a non-limiting example, the cooking appliance 10 may be a counter-top cooking appliance having both a steam heating compartment 30 and an air fryer heating compartment 20. However, it will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations.

As shown in the Figures, one or more cooking or heating compartments 20, 30 may be used within a home cooking appliance 10, such as but not limited to a counter-top cooking appliance, has a housing 12 defining one or more cooking compartments, such as an air fryer cooking or first heating compartment 20 and the steam or second heating compartment 30. In the one embodiment shown, the appliance 10 is generally used in a domestic setting and provides a means of preparing food for eating by circulating a flow of hot air around the food contents to heat and/or cook the food and/or provides a means of preparing food for eating by steaming the food contents to heat and/or cook the food. Such an apparatus includes an enclosed food preparation chamber or first heating compartment 20 (e.g. air frying), into which food contents 1 are placed and a flow of hot air 2 is then circulated around the food, until the food is cooked. The apparatus comprises another enclosed food preparation chamber or second heating compartment 30 (e.g. steam), into which food contents 3 and water 4 are placed and the water is heated thereby creating steam around the food, until the food is cooked. As will be described herein, the cooking appliance 10 can selectively utilize air frying components in one heating compartment 20 for cooking food contents/product 1 that are placed in a first food container 22 and/or steam for cooking food contents/product 3 in another heating compartment 30 that are placed in a second food container 32. Control over cooking appliance 10 by a user is generally managed through a control panel 40 typically disposed on a top or front of the housing 12, or portions thereof, and it will be appreciated that in different appliance designs, the control panel 40 may include various types of user interfaces 91 including various input and/or output devices, including various knobs, buttons, lights, switches, textual and/or graphical displays, touch screens, etc. through which a user may configure one or more settings and start and stop a steam cycle and/or air fry cycle.

Figure 2:
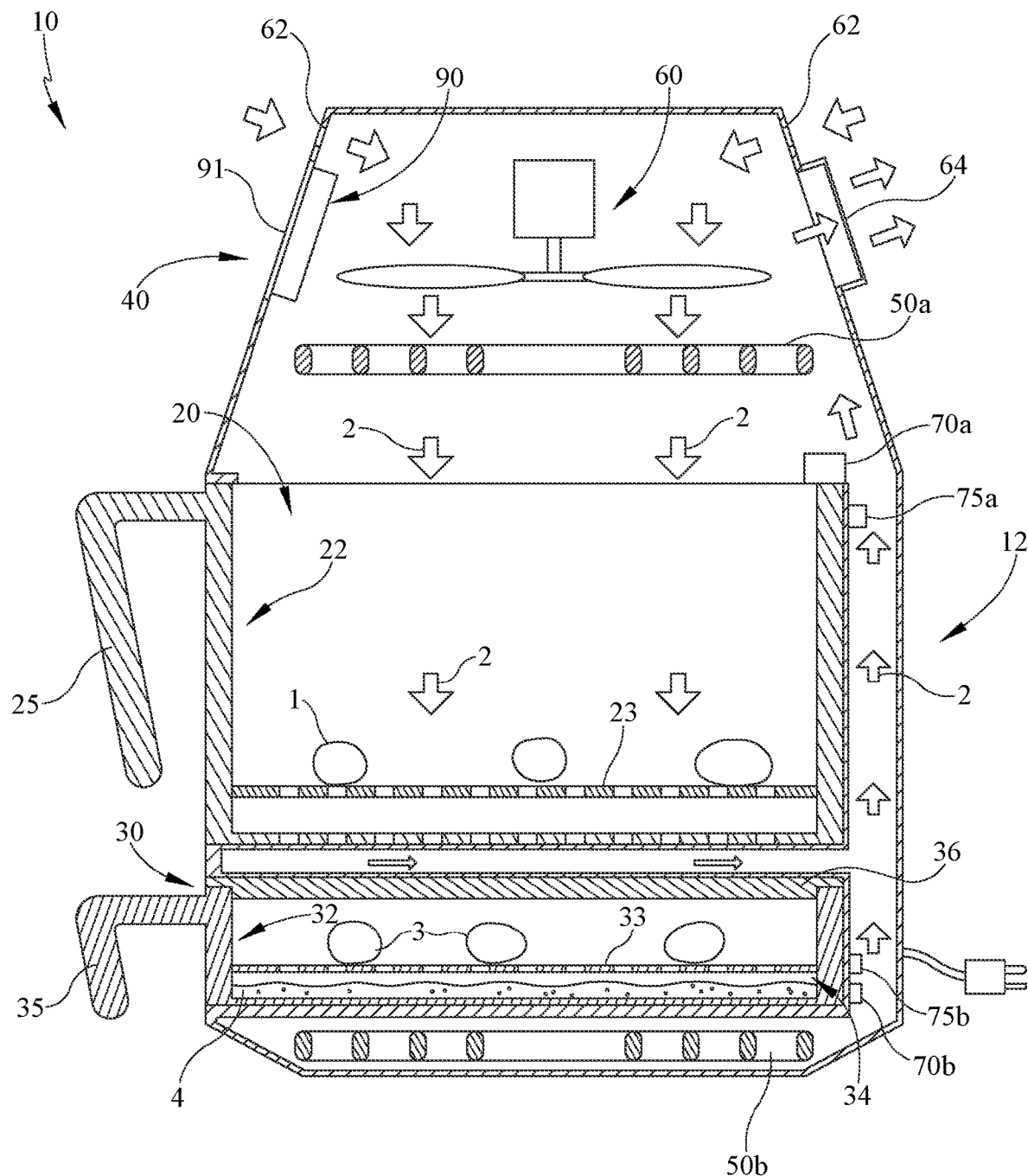
FIG. 2 is a sectional view of the cooking appliance taken along line 2-2 of FIG. 1.
Figure 3:
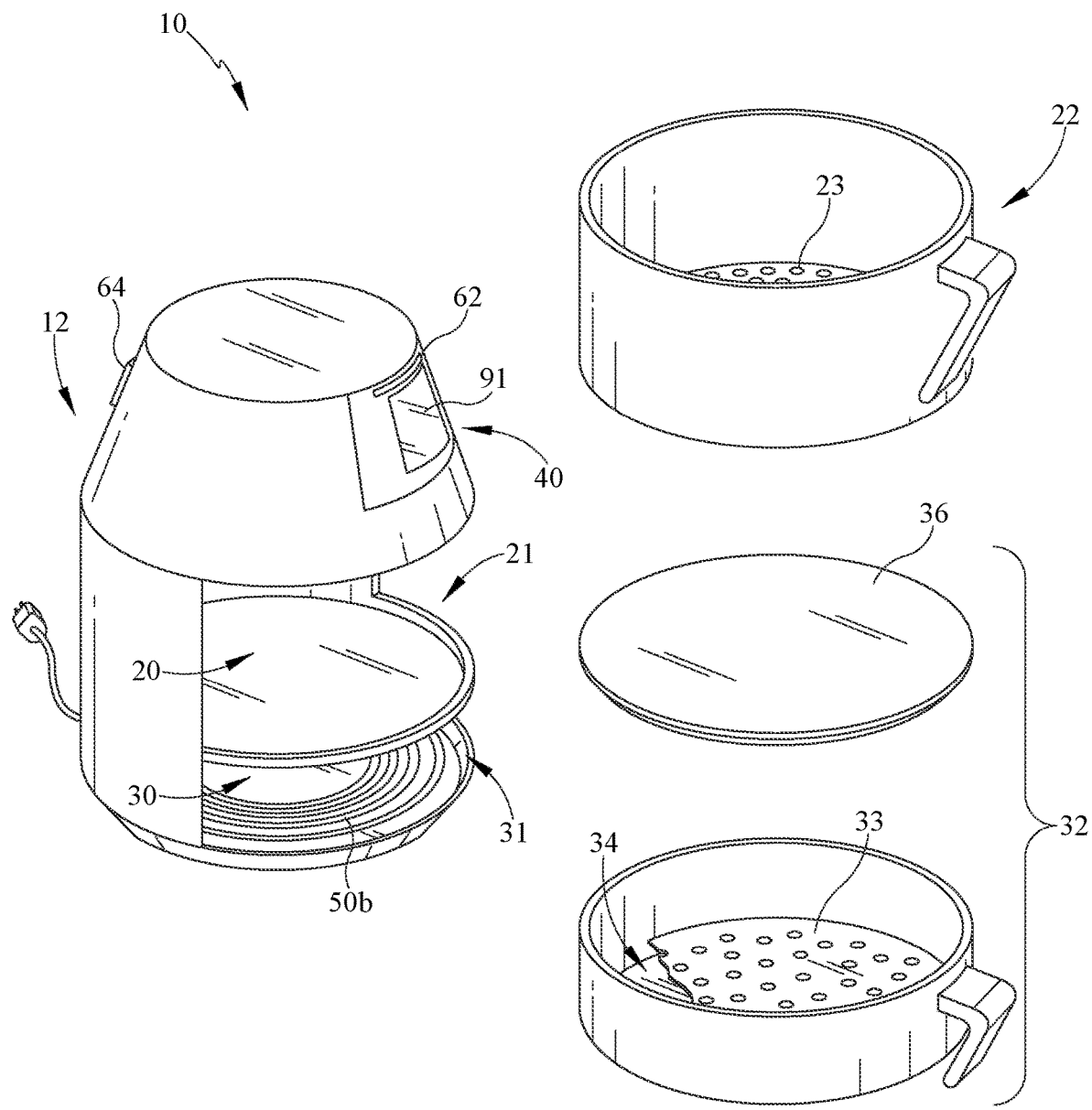
FIG. 3 is a perspective view of FIG. 1 with the steam and air fryer food containers exploded away from the housing in the open or deployed position, illustrating the lid exploded away from the lower or steam food container.

In some implementations, the housing 12 may include a plurality of heating compartments 20, 30. The housing 12 may include one or more food containers 22, 32 positioned in each of the heating compartments 20, 30. In the one embodiment shown, the each of the heating compartments 20, 30 includes at least one food container (e.g. drawer, basket, etc.). The first heating compartment or air fryer heating compartment 20 may include the first food container 22 (e.g. drawer). The second heating compartment or stream heating compartment 30 may include the second food container 32 (e.g. drawer 32). The housing 12 or heating compartment 20, 30 may include an opening 21, 31 removably receiving the food container 22, 32, respectively. The containers or drawers 22, 32 may include rails or slides allowing the container/drawer to be accessible and/or removed. The containers 22, 32 are configured between an open or deployed position (FIG. 3) for the loading and unloading of their respective food product and/or water, and a dosed, stowed, or operating position when engaged with the housing 12 (FIGS. 1 and 2). In the open position, the container or drawer 22, 32 may be detached or remain attached to the remainder of the housing 12 and still unload/load the food contents and/or water. The food containers or drawers 22, 32 may be deployed from the closed position towards another position (e.g. open position).

The housing 12 may include the first heating compartment 20 and the second heating compartment 30 in a variety of positions therein. In the one embodiment shown in the Figures, the first heating compartment 20 and the second heating compartment 30 are stacked in a vertical configuration or along the longitudinal axis of the housing. The first heating compartment 20 or first food container 22 may be positioned above or at a higher elevation than the second heating compartment 30 or second food container 32. Although not shown, the second heating compartment 30 or second food container 32 may be positioned above or at a higher elevation than the first heating compartment 20 or first food container 22.

In some implementations, the food container 22, 32 may be a drawer as shown in the one embodiment. In some embodiments, the container 22, 32 may include a mesh container or basket 23, 33 having an inner area that is sufficiently large to hold a specified quantity of food. The mesh basket 23, 33, if used, within the drawer 22, 32 may be relatively dense or loose, depending on the desired amount of access to air or steam that is desired within the basket itself. As shown more clearly in FIG. 3, the first food container 22 may include a wire basket 23, if used, and/or the second food container 32 may include a wire basket 33, if used. The basket 23, 33, if used, may be made of materials other than mesh, such as a solid material sheet with perforations, for example, or other materials. The basket 33 of the second food container 32 may be positioned above a water compartment or area 34 within the bottom of the second food container 32 to hold the water 4 subsequently heated into steam. The steam may then rise though the perforations of the basket and/or around the basket 33. One or more drawer handles or recesses 25, 35, if used, may be provided on the food container 22, 32, or portions thereof to assist stowing/deploying of the drawer or container.

In some implementations, the one or more of the food containers 22, 32 may include one or more lids 36. The one or more lids 36 may be positionable with the food container 22, 32 (e.g. drawer) between the open and closed positions of the food container relative to the heating compartment/housing. In the one embodiment shown, the second food container 32 of the second heating compartment 30 may include a lid 36. The lid 36 may seal a top opening of the drawer 32 to heat the water 4 and/or hold the steam inside the container to steam the food contents 3 therein. Although not shown, if used, the lid or potions thereof may automatically opening upon deployment of the drawer 32 from the closed or stowed position, releasing steam therein.

In some embodiments, the appliance 10 or one or more heating compartments 20, 30 may include one or more heating devices 50a, 50b in communication therewith. As shown in the one embodiment, each one of the heating compartments 20, 30 includes one or more heating devices 50a, 50b. The first heating compartment 20 may include a heating device 50a in communication with the first food container 22. A circulating device 60 (e.g. motor, fan, etc.) may operate with the first heating device 50a to communicate with the first food container 22 or compartment 20 to heat the contents of the first food container by circulating air (e.g. hot air). The second heating compartment 30 may include a heating device 50b in communication with the second food container 32. The second heating device 50b may heat the water 4 within the second heating compartment 30/container 32 to steam the contents within the second food container 32. The first heating device 50a and/or fan 60 may be positioned above or at a higher elevation than the first heating compartment 20 or first food container 22. The second heating device 50b may be positioned below or at a lower elevation than the second heating compartment 30 or second food container 32.

The heating device 50a, 50b may be a variety of positions within the appliance 10 or housing 12, quantities, shapes, sizes, and constructions. The heating device 50a, 50b may include quartz tube heaters, wound mica heaters, halogen tube heaters, or other types of heaters (e.g. tubular heaters), such as those commercially available under the trade name "Calrod," for example. In the one embodiment shown, the heating device are electric heaters that are used to produce radiant heat within the housing.

In some implementations, one or more circulating devices 60 may be used to circulate air. The air may be circulated with and/or without one or more heating devices 50a, 50b heating or producing heat. The circulating devices 60 may circulate air to and/or from one or more heating compartments 20, 30 and/or food containers 22, 32. In some embodiments as shown in the Figures, one or more fans 60 (e.g. a centrifugal fan) are provided generally adjacent to the heating device 50a, 50b to circulate the air (e.g. heated) through the housing 12 and into the heating compartment (e.g. first heating compartment 20) or food container (e.g. first food container 22). The one or more circulating devices 60 may circulate air (e.g. heated) to and/or from the first food container 22 or heating compartment 20 as shown in the Figures to air fry the contents therein. In some embodiments, the circulating device 60 may circulate air and/or steam to and/or from the second food container 32 or heating compartment 30. For example, although the second food container 32 or heating compartment 30 is shown in the one embodiment to steam the food contents 3 therein it should be understood that the second heating compartment 30 may be used as an air fryer in some embodiments or cycles. The air circulating device(s) 60 may circulate air between and/or away from the heating compartments 20, 30 in some embodiments. The air circulating device 60 may be in fluid communication with one or more inlets 62 and/or outlets 64 of the housing 12. The inlet 62 and/or outlet 64 may be in fluid communication with one or more of the heating compartments 20, 30. The first heating compartment 20 may be in fluid communication with the one or more inlets 62. Although the air is circulated to the first food container 22 in the one embodiment shown, in some embodiments air may be circulated towards both the compartments. The one or more outlets 64 as shown in the one embodiment in FIG. 2 may be in downstream communication with one or both of the first and second heating compartments 20, 30. Air and/or steam may be exhausted from at least one of the first heating compartment 20/container and the second heating compartment 30/container 32. Although both compartments 20, 30 are shown upstream from the outlet 64, only one of the compartments may be in fluid communication with the outlet. A single outlet 64 may be downstream of the one or more compartments. Alternatively two of more outlets 64 and air flow channels, if used, may be used separately in downstream communication from the corresponding compartment separating their exhaust paths. The air circulating device 60, inlet 62, and/or outlets 64 may be a variety of sizes, shapes, quantities, positions, and constructions and still be within the scope of the invention.

Figure 4:
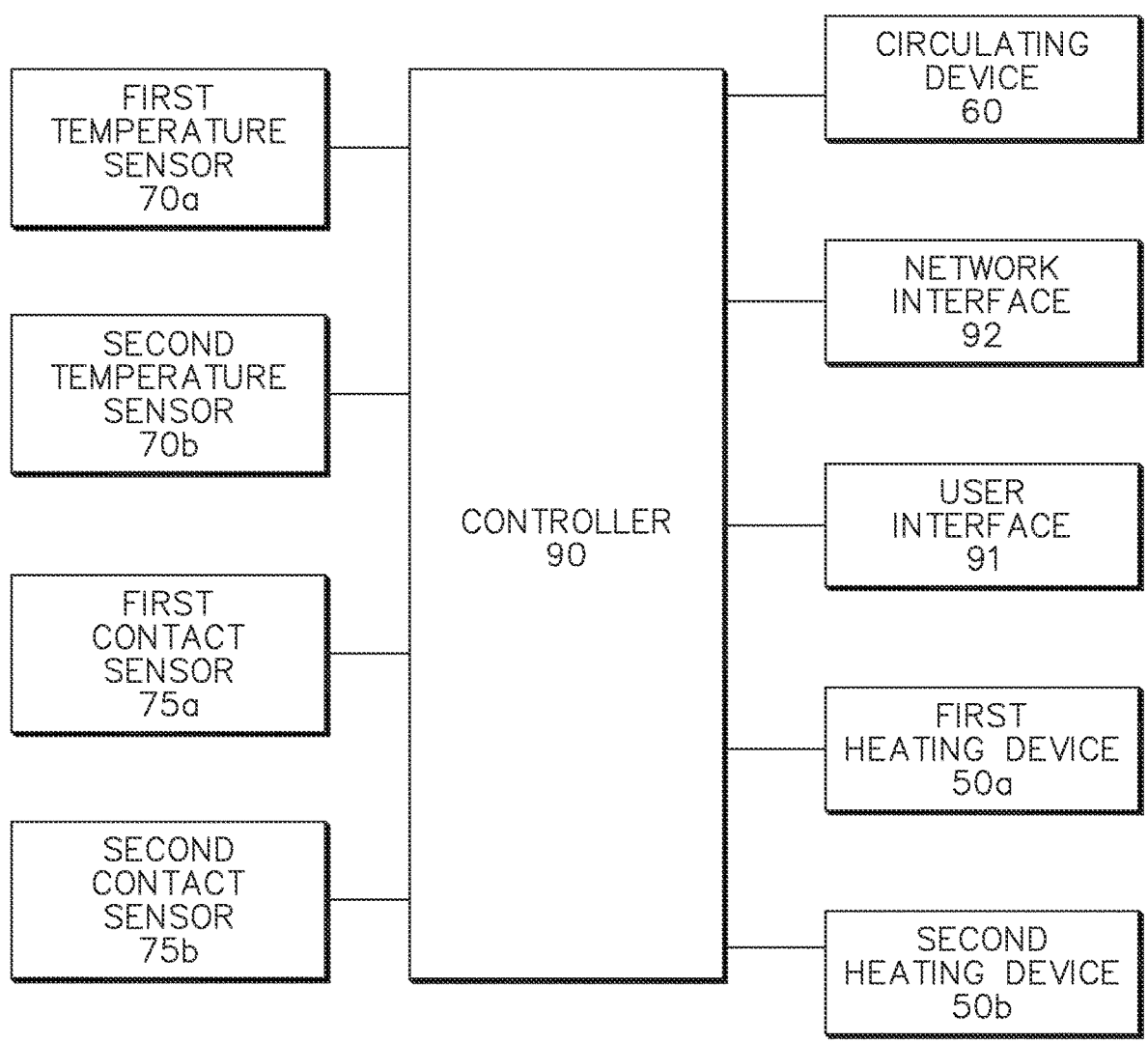
FIG. 4 is a block diagram of an example control system for the cooking appliance.

In some implementations as shown in FIG. 4, cooking appliance 10 may be under the control of a controller 90 that receives inputs from a number of components and drives a number of components in response thereto. Controller may for example, include one or more processors and a memory (not shown) within which may be stored program code for execution by the one or more processors. The memory may be embedded in the controller, but may also be considered to include volatile and/or non-volatile memories, cache memories, flash memories, programmable read-only memories, read-only memories, etc., as well as memory storage physically located elsewhere from controller, e.g., in a mass storage device or on a remote computer interfaced with controller.

The controller 90 may be interfaced with various components of the cooking appliance 10, to control one or more air frying cycles and/or one or more steam cycles to cook food contents in the one or more heating compartments. In some implementations, the first heating device 50a and/or circulating device 60 may circulate air 2 (e.g. air or hot air) to the food contents 1 within the first food container 22 or heating compartment 20 for a first time period during at least a portion of the one or more air frying cycles. In some embodiments, the second heating device 50*b* may steam (e.g. heat water 4 within the container) the food contents 3 within the second food container 32 or heating compartment 30 for a second time period during at least a portion of the one or more steam cycles. In various embodiments, the first time period and the second time period may overlap. In some embodiments, a portion of the first time period and a portion of the second time period may overlap. In various embodiments, the first and second time periods may not overlap. In some implementations, the heating devices (e.g. first 50*a* and second 50*b*) may radiate heat or heat the food/water/steam at the same, different, or overlapping time period(s), or portion of the timer period, to cook the respective food in their corresponding compartments. As a non-limiting example, the air frying cycle or heating/circulating of the first heating compartment may overlap at least partially in time with the steam cycle or heating (e.g. steam) of the second heating compartment. The user may steam food separate from the air frying food. In some applications, the user may use one of the heating compartments as desired.

The controller 90 may be coupled to the first heating device 50*a* and the circulating device 60, or portions of the cooking appliance 10, to circulate air 2 (e.g. hot air) to the contents 1 within the first food container 22/heating compartment 20 for one or more air fryer cycles. The controller 90 may circulate hot air 2 to the contents within the first food container 22 for the one or more first time periods. It should be understood that the circulating device 60 (e.g. fan, motor) may operate at one or more time intervals before, during, and/or after the first heating device 50*a* is activated in a variety of air fryer cycles. The controller 90 may control the first heating device to activate/deactivate when the air is circulating and/or is not circulating during a cycle. More particularly as shown in FIG. 4, the controller 90 may be coupled to a first temperature sensor 70*a*, if used, in order to control and/or determine the temperature of the food contents 1, first heating device 50*a*, circulating device 60, first food container 22, and/or first heating compartment 20. If used, the temperature may be used to determine the food/container and/or compartments temperature or verify when the food contents are cooked as desired.

The controller 90 may be coupled to the second heating device 50*a*, or portions of the cooking appliance 10, to heat or steam the contents 3 within the second food container 32/heating compartment 30 for one or more steam cycles. The controller 90 may heat the water 4 to steam the contents 3 within the second food container 32 for one or more second time periods. The controller 90 may control the second heating device 50*b* to activate/deactivate the steam or heat. More particularly as shown in FIG. 4, the controller 90 may be coupled to a second temperature sensor 70*b*, if used, in order to control and/or determine the temperature of the food contents 3, second heating device 50*b*, second food container 32, and/or first heating compartment 30. If used, the temperature may be used to determine the food/container and/or compartments temperature or verify when the food contents are cooked as desired.

Additional sensors and actuators may also be used in some embodiments, including a contact sensor, or micro switch 75*a*, 75*b* to determine when the food container (e.g. first and/or second) is in the closed position and/or open positon. In some embodiments such a contact sensor (e.g. first contact sensor 75*a*, second contact sensor 75*b*) may be disposed on or in cooking appliance 10, opening 21, 31, and/or container 22, 32 (e.g. drawer), or variety of positions within the housing 12. In some embodiments, the one or more micro switches, if used, may be configured to detect if one or more of the containers is deployed and/or stowed within the housing. These micro switches, if present, may be actuated through minimal physical force/contact by the one or more containers/drawers by use of a tipping-point mechanism, and as such they may, in some instances, be desirable for the detection of a location and/or presence of a drawer/basket. One or more parameters of the steam and/or air fryer cycles may be configured based on the one or more sensors, or contact sensor. As a non-limiting example, the contact sensor, if used, may be desirable to detect the drawer in the closed position to activate the one or more cycles of the respective heating compartment. Further, the detection of the drawer away from the closed position (e.g. open or deployed position) may deactivate and/or pause the one or more cycles of the respective heating compartment. Moreover, controller 90 may be coupled to a user interface 91 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 90 may also be coupled to one or more network interfaces 92, e.g., for interfacing with external devices via wired and/or wireless networks such as Ethernet, Bluetooth, NFC, cellular and other suitable networks.

Moreover, in some embodiments, at least a portion of controller 90 may be implemented externally from a cooking appliance, e.g., within a mobile device, a cloud computing environment, etc., such that at least a portion of the functionality described herein is implemented within the portion of the controller that is externally implemented. In some embodiments, controller may operate under the control of an operating system and may execute or otherwise rely upon various computer software applications, components, programs, objects, modules, data structures, etc. In addition, controller may also incorporate hardware logic to implement some or all of the functionality disclosed herein. Further, in some embodiments, the sequences of operations performed by controller to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

In use, in some implementations, a first food product 1, if desired to be cooked (e.g. air frying), may be positioned or placed into the air fryer or first food container 22 and subsequently positioned to the closed position within the housing 12. In various embodiments, a second food product 3 and water 4, if desired, may be positioned or placed in the steam or second food container 32 and subsequently positioned to the closed position within the housing 12. A lid 36, if used, may cover the contents 3 and water 4 of the container 32. The controller may be used to turn on and/or off the air fryer cycle/function and/or the steam cycle/ function. With the detection of the location and/or presence of a drawer/basket/container by the one or more contact switches 75a, 75b, if used, the steam and/or air fryer cycle may be selected by the user and/or the heating may be activated, etc. The first food product 1 may be cooked by the heated and/or circulated air 2. The first heating device 50a and/or circulating device 60 may operate for a first time period. The second food product 3 may be cooked by the steam generated within the heating compartment 30 or second food container 32. The second heating device 50b may operate for a second time period. The first and/or second time period(s) may be predetermined and/or selected by the user. The control may use one or more timers (not shown) to set the cooking or time period(s). The time period(s) may be determined by the temperature within the housing or portions thereof (e.g. the temperature of the food container, food contents, air, and/or steam, etc.). The time period(s) may be determined by the position of the food container in some embodiments. For example, the time period may be stopped when the drawer or food container moves away from the closed position and/or started when the container is in the closed position. The first and the second time periods may be the same or different time period. For example if different, the steamed food may be completed before the air fryer compartment is completed or started. Further, the first time period of generating heat and/or air circulating and the second time period of generating heat may overlap during at least a portion of the cooking. Alternatively, the operation of one or more cooking components may not overlap in some embodiments. The first heating compartment 20 or air 2 may be heated by the first heating device 50a and the second heating compartment 30 or water 4 may be heated by the second heating device 50b. The temperature within one or more of the food containers/compartments, or other portions of the housing, may determine the operation of the one or more heating devices and/or circulating device to cook the food in the one or more food containers. Air may be circulated into and/or out of the housing/heating compartment (e.g. 20). Air may be exhausted from the first heating compartment (e.g. through one or more outlets). Steam and/or air may be circulated into and/or out (e.g. exhausted though one or more outlets) of the housing/heating compartment (e.g. 30). Steam may also be exhausted from the second heating compartment or second food container 32 when removed or deployed from the closed position. For example, the lid 36 or portions thereof, if used, may be manually or automatically opened when deploying the container 32 from the closed position, which may release steam or a portion thereof.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A cooking appliance comprising:
   a housing defining a first heating compartment;
   a first food container positioned in the first heating compartment;
   a circulating device and a first heating device in communication with the first food container to heat the contents by circulated air within the first food container;
   the housing defining a second heating compartment;
   a second food container positioned in the second heating compartment;
   a second heating device in communication with the second food container to steam the contents within the second food container;
   a controller configured to control the first heating device and the circulating device to circulate hot air to the contents within the first food container, and configured to control the second heating device to steam the contents within the second food container.

2. The cooking appliance of claim 1 wherein the controller circulates hot air to the contents within the first food container for a first time period and steam the contents within the second food container for a second time period.

3. The cooking appliance of claim 2 wherein at least a portion of the first time period overlaps with at least a portion of the second time period.

4. The cooking appliance of claim 1 wherein the controller controls the first heating device for a first time period and the second heating device for a second time period.

5. The cooking appliance of claim 1 wherein the first heating compartment is positioned above the second heating compartment, and wherein the first heating device and the circulating device is positioned above the first heating compartment and the second heating device is positioned below the second heating compartment.

6. The cooking appliance of claim 1 further comprising one or more inlets and one or more outlets, wherein the first heating compartment is in communication with the one or more inlets, and wherein the one or more outlets are in downstream communication with at least one of the first heating compartment and the second heating compartment.

7. The cooking appliance of claim 1 wherein the second food container positioned in the second heating compartment includes a drawer, wherein the drawer includes a lid.

8. A cooking appliance comprising:
   a housing defining a first heating compartment;
   a first food drawer positioned in the first heating compartment;
   a circulating device and a first heating device positioned above the first food drawer and is in communication with the first food drawer to heat the contents by circulated air within the first food drawer;
   the housing defining a second heating compartment below the first heating compartment;
   a second food drawer positioned in the second heating compartment;
   a second heating device positioned below the second food drawer and is in communication with the second food drawer to steam the contents within the second food drawer;
   a controller configured to control the first heating device and the circulating device to circulate hot air to the contents within the first food drawer, and configured to control the second heating device to steam the contents within the second food drawer.

9. The cooking appliance of claim 8 further comprising one or more inlets and one or more outlets, wherein the first heating compartment is in communication with the one or more inlets, and wherein the one or more outlets are in downstream communication with at least one of the first heating compartment and the second heating compartment.

10. The cooking appliance of claim 8 wherein the second food drawer includes a lid.

11. The cooking appliance of claim 8 wherein the controller controls the first heating device for a first time period and the second heating device for a second time period.

12. The cooking appliance of claim 11 wherein at least a portion of the first time period overlaps with at least a portion of the second time period.

13. The cooking appliance of claim 8 wherein the controller circulates hot air to the contents within the first food drawer for a first time period and steam the contents within the second food drawer for a second time period.

14. The cooking appliance of claim 13 wherein at least a portion of the first time period overlaps with at least a portion of the second time period.

* * * * *